United States Patent
Daerr et al.

(10) Patent No.: US 9,759,822 B2
(45) Date of Patent: Sep. 12, 2017

(54) DETECTION DEVICE FOR DETECTING PHOTONS AND METHOD THEREFORE

(71) Applicant: KONINKLIJKE PHILIPS N.V., Eindhoven (NL)

(72) Inventors: Heiner Daerr, Hamburg (DE); Christoph Herrmann, Aachen (DE); Frank Bergner, Hamburg (DE); Roger Steadman Booker, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 15/038,768

(22) PCT Filed: Nov. 20, 2014

(86) PCT No.: PCT/EP2014/075065
§ 371 (c)(1),
(2) Date: May 24, 2016

(87) PCT Pub. No.: WO2015/078753
PCT Pub. Date: Jun. 4, 2015

(65) Prior Publication Data
US 2016/0377745 A1     Dec. 29, 2016

(30) Foreign Application Priority Data
Nov. 27, 2013    (EP) .................................. 13194618

(51) Int. Cl.
*G01T 1/26* (2006.01)
*G01T 1/24* (2006.01)
*G01T 1/17* (2006.01)

(52) U.S. Cl.
CPC ................ *G01T 1/247* (2013.01); *G01T 1/17* (2013.01); *G01T 1/249* (2013.01)

(58) Field of Classification Search
CPC ......... G01T 1/24; G01T 1/247; G01T 1/2928; H01L 27/14659
See application file for complete search history.

(56) References Cited

U.S. PATENT DOCUMENTS 6,028,313 A * 2/2000 McDaniel ............. G01T 1/1642
250/338.4
6,609,075 B1    8/2003 Warburton et al.
(Continued)

FOREIGN PATENT DOCUMENTS

WO    2007/010448    1/2007
WO    2012/095710    7/2012
(Continued)

OTHER PUBLICATIONS

Kraft, et al., "Counting and Integrating Readout for Direct Gonversion X-ray Imaging: Concept, Realization and First Prototype Measurements", IEEE Transactions on Nuclear Science, vol. 54, pp. 383 to 390 (2007).

(Continued)

*Primary Examiner* — Kiho Kim

(57) ABSTRACT

The present invention relates to a detection device (6) for detecting photons emitted by a radiation source (2). The detection device (6) is configured to detect the photons during a first time period. The detection device (6) comprises a sensor (10) having an intermediate direct conversion material for converting photons into electrons and holes, a shaping element (20), and a compensation unit (450, INT, 950). The compensation unit (450, INT, 950) is adapted to provide a compensation signal based on the electrical pulse and on a photoconductive gain of said sensor (10). The core of the invention is to provide circuits to reduce artifacts due to inherent errors with direct conversion detectors in spectral computed tomography by determining a compensation cur- (Continued)

rent, by detecting or monitoring a baseline restorer feedback signal, or by ignoring signals above the baseline level.

15 Claims, 8 Drawing Sheets

(56) References Cited

U.S. PATENT DOCUMENTS

| | | |
|---|---|---|
| 2004/0027183 A1 | 2/2004 | Binkley |
| 2010/0172467 A1 | 7/2010 | Steadman |
| 2011/0204245 A1* | 8/2011 | Robert .............. G01T 1/24 250/370.08 |
| 2012/0112088 A1 | 5/2012 | Abraham |
| 2015/0234058 A1* | 8/2015 | Engel .............. G01T 1/249 250/370.08 |

FOREIGN PATENT DOCUMENTS

| | | |
|---|---|---|
| WO | 2013/057645 | 4/2013 |
| WO | 2014/087264 | 6/2014 |
| WO | 2014/091278 | 6/2014 |

OTHER PUBLICATIONS

Steadman, et al., "ChromAIX: a high-rate energyresolving photon-counting ASIC for spectral computed tomography", Proceedings of SPIE, pp. 762220-762220-8 (2010).

Bale, et al., "Nature of polarization in wide-bandgap semiconductor detectors under high-flux irradiation: Application to semi-insulating Cd1-xZnxTe", Physical Review B 77, 2008.

Bale, et al., "Electron transport and charge induction in cadmium zinc telluride detectors with space charge build up ander intense x-ray irradiation", J. Appl. Phys. 107, 114512 (2010).

Kruger, et al., "A detector for spectrally enhanced x-ray imaging by simultaneous counting and integrating", Proceedings of SPIE, vol. 6913, Mar. 6, 2008.

* cited by examiner

DETECTION DEVICE FOR DETECTING PHOTONS AND METHOD THEREFORE

CROSS REFERENCE TO RELATED APPLICATIONS

This application is the U.S. National Phase application under 35 U.S.C. §371 of International Application No. PCT/EP2014/075065, filed Nov. 20, 2014, published as WO 2015/078753 on Jun. 4, 2015, which claims the benefit of European Patent Application Number 13194618.8 filed Nov. 27, 2013. These applications are hereby incorporated by reference herein.

FIELD OF THE INVENTION

The invention relates to a detection device and a detection method for detecting photons emitted by a radiation source.

BACKGROUND OF THE INVENTION

If Cd[Zn]Te with not fully blocking (cathode) contacts is used for single photon counting detectors, the photoconductive gain causes a major problem especially for DC coupled readout electronics: Since it is a slowly changing current on top of the photocurrent, it causes a baseline shift at the output of the analog readout channel towards the set energy thresholds so that, without any correction means, the energies of the photons is wrongly registered. If the persistent current changes very slowly, and pile-up is limited, known approaches like conventional baseline restoration (BLR) can be applied. It is well-known that the conventional BLR approach of sensing the baseline (BL) at the output of the shaper (SHA) will result in significantly wrong baseline estimates, if pulses at the output of the SHA pile-up frequently: In this case, the BL is no longer reached so the BL is wrongly estimated.

An additional effect may be caused by induced pulses from neighbor pixels, which have a bipolar waveform. Depending on the phase of an induced pulse relative to the signals of real pulses, the induced pulse can contribute to pile-up or reduce the pile-up visible on the SHA output signal.

Further, even at low x-ray fluxes but long irradiation times the sensor gets polarized. This is the case during the energy calibration of the detector in which the correct threshold positions should be determined. Polarization distorts the calibration.

In addition to the above, baseline restorer circuits are typically implemented by using a peak detector that senses the baseline, a low pass filter (e.g. an integrator) to restrict to the compensation of low frequency BL shifts and (a) transconductor element(s) in charge of injecting or sinking a compensating current at the input node (or shaper input depending upon implementation). The peak detector within the BLR circuit is however very sensitive to excursions of the shaper output level in the opposite direction of the expected background current, particularly above the BL (in an implementation where the shaper output signal is a pulse below this BL). That is, a signal above the BL level will be sensed by the peak detector as if it were the new BL level, causing a correction equal to the full signal excursion above the BL level in the worst case. Such excursions above the BL level can primarily be caused by two non-ideal artifacts; namely induced pulses (which have a bi-polar shape around the BL level) from neighboring pixels and shaper overshoot (a small half wave above the BL level).

US2010172467A1 relates to an apparatus for generating countable pulses from impinging X-ray in an imaging device, in particular in a computer tomograph. The apparatus comprises a pre-amplifying element adapted to convert a charge pulse generated by an impinging photon into an electrical signal and a shaping element having a feedback loop and adapted to convert the electrical signal into an electrical pulse. A delay circuit is connected to the feedback loop such that a time during which the feedback loop collects charges of the electrical signal is extended in order to improve an amplitude of the electrical pulse at an output of the shaping element.

US2004027183A1 discloses a continuous-time baseline restoration (BLR) circuit providing built-in pulse tail-cancellation, or BLR tail-cancel circuit, in constant fraction discriminator (CFD) arming and timing circuits. The BLR tail cancel circuit is applied at the output of constant fraction timing shaping filters and arming circuits to permit monolithic integrated circuit implementation of CFD circuits operating at high input signal count rates. The BLR tail-cancel circuit provides correction of dc offset and count-rate dependent baseline errors along with simultaneous tail-cancellation. Correction of dc offsets due to electronic device mismatches and count-rate dependent baseline errors is required for accurate time pickoff from the input signals. The reduction of pulse width, or pulse tail-cancellation is required to shorten the duration of high count rate signals to prevent the severe distortion caused by the occurrence a new signal superimposed on the tails of previous signals, a condition known as pulse pileup. Without pulse tail-cancellation, there are substantial errors in time pickoff due to the pulse pileup.

WO2013057645A2 discloses an imaging system includes a detector array with direct conversion detector pixels that detect radiation traversing an examination region of the imaging system and generate a signal indicative of the detected radiation, a pulse shaper configured to alternatively process the signal indicative of detected radiation generated by the detector array or a set of test pulses having different and known heights that correspond to different and known energy levels and to generate output pulses having heights indicative of the energy of the processed detected radiation or set of test pulses, and a thresholds adjuster; configured to analyze the heights of the output pulses corresponding to the set of test pulses in connection with the heights of set of test pulses and a set of predetermined fixed energy thresholds and generate a threshold adjustment signal indicative of a baseline based on a result of the analysis.

The article "*Counting and Integrating Readout for Direct Gonversion X-ray Imaging: Concept, Realization and First Prototype Measurements*" by E. Kraft et al., IEEE Transactions on Nuclear Science, volume 54, pages 383 to 390 (2007) discloses a signal processing concept for X-ray imaging with directly converting pixelated semiconductor sensors. The approach combines charge integration and photon counting in every single pixel. Simultaneous operation of both signal processing chains extends the dynamic range beyond the limits of the individual schemes and allows determination of the mean photon energy. Medical applications such as X-ray computed tomography can benefit from this additional spectral information through improved contrast and the ability to determine the hardening of the tube spectrum due to attenuation by the scanned object. A prototype chip in 0.35-micrometer technology has been successfully tested. The pixel electronics are designed using a low-swing differential current mode logic. Key element is a configurable feedback circuit for the charge sensitive amplifier which provides continuous reset, leakage current compensation and replicates the input signal for the integrator. The article discusses measurement results of the prototype structures and gives details on the circuit design.

The article "*ChromAIX: a high-rate energyresolving photon-counting ASIC for spectral computed tomography*" by R. Steadman et al., Proceedings of SPIE, pages 762220-762220-8 (2010) discloses a study of the feasibility of Spectral CT. An energy-resolving proprietary photon counting ASIC (ChromAIX) has been designed to provide high count-rate capabilities while offering energy discrimination. The ChromAIX ASIC consists of an arrangement of 4 by 16 pixels with an isotropic pitch of 300 micrometers. Each pixel contains a number of independent energy discriminators with their corresponding 12-bit counters with continuous read-out capability. Observed Poissonian count-rates exceeding 10 Mcps (corresponding to approximately 27 Mcps incident mean Poisson rate) have been experimentally validated through electrical characterization. The measured noise of 2.6 $mV_{RMS}$ (4 keV FWHM) adheres to specifications. The ChromAIX ASIC has been specifically designed to support direct-converting materials CdZnTe and CdTe.

A reduction of artifacts due to inherent errors with direct conversion detectors in spectral computed tomography (CT) is desirable.

SUMMARY OF THE INVENTION

It is an object of the present invention to provide a detection device and a detection method, which reduce artifacts due to inherent errors with direct conversion detectors in spectral computed tomography (CT).

In a first aspect of the invention, there is provided a detection device for detecting photons emitted by a radiation source. The detection device is configured to detect the photons during a first time period. The detection device comprises a sensor comprising an anode, a cathode and an intermediate direct conversion material for converting photons into electrons and holes, a shaping element adapted to convert a charge pulse generated by a photon into an electrical pulse, and a compensation unit coupled between an output of the shaping element and an input of the shaping element. The compensation unit comprises a photoconductive gain providing unit. The photoconductive gain providing unit is configured to provide a photoconductive gain for said sensor. The compensation unit further comprises a second-time-period current providing unit. The second-time-period current providing unit is configured to provide a current from said sensor during at least a second time period. The second time period is shorter than said first time period. The compensation unit is adapted to provide a compensation signal to said shaping element. The compensation signal is based on the current from said sensor and on the photoconductive gain for said sensor.

A key idea of the present invention is to compensate for artifacts due to inherent errors with direct conversion detectors (such as, e.g., persistent currents or overshoots). Artifacts are reduced e.g. by determining a compensation current from the measured total pixel current and the photo-conductive gain, by detecting or monitoring a baseline restorer feedback signal to determine a degree of polarization within the sensor for every read-out of the detector, or by including a circuit at the input of a baseline restorer circuit that ensures that any signal above the baseline level is ignored. In this context, note that the term "above" is not a restriction and depends upon implementation. Namely, "above" in this context means signals which have the opposite polarity as the expected regular shaper pulses. Preferably, the baseline restoration circuit ignores or does not react to a signal "above" the baseline. Thereby, the impact of induction pulses onto the baseline restorer is reduced or even eliminated.

The detection device is preferably a photon counting detection device (also known as energy discriminating photon counting detection device), i.e., a detection device that energy discriminates the detected photons into one or more energy intervals and that provides for each energy interval a count representing the number of detected photons having an energy that falls into the respective energy interval. Such detection devices are used, for example, in medical imaging systems, such as medical computed tomography (CT) systems, medical positron emission tomography (PET) systems, or medical single photon emission computed tomography (SPECT) systems.

The radiation source can be, for example, an X-ray tube or a similar device, a source of gamma radiation, such as a gamma emitting radionuclide, or a positron emitting radionuclide. Preferably, the radiation source can be a polyenergetic radiation source, i.e., a radiation source that emits photons at two or more energy levels.

In a preferred embodiment of the invention, the compensation unit comprises a first, second, and third current source, and a first and a second transistor. A source of the first transistor and a source of the second transistor are coupled to the first current source.

The first, second, and third current sources, and the first and second transistors form a differential pair. Due to the properties of a differential pair, any DC current that is generated by the sensor, will be drained by the right branch of the differential pair. The drain current of the first transistor takes on a value such that the drain current of the second transistor allows for accommodating this DC current from the sensor. Assuming that the sensor generates a positive DC current, the current through the second transistor will be reduced, which can only happen, if the gate voltage of the first transistor changes such that the drain current through the first transistor increases. Consequently, it is possible to fully compensate the dark current.

In an embodiment, the second time period is within the first time period; wherein the second-time-period current providing unit is configured to measure a pixel current from said sensor during the second time period; and wherein the current from said sensor provided by the second-time-period current providing unit corresponds to said pixel current.

In a further preferred embodiment of the invention, a drain of the first transistor is coupled to the second current source. A drain of the second transistor is coupled to the third current source. The electrical pulse is provided to a gate of the first transistor. A reference voltage is provided to a gate of the second transistor. The drain of the second transistor is coupled to the input of the shaping element.

By coupling the drain of the second transistor to the input of the shaping element any DC current that is generated by the sensor, will be drained by the right branch of the differential pair. In this embodiment, a current sum of left and right channels of the differential pair is measured, i.e. if there is only a dark current present. The dark current is fully compensated, if the voltage output by the shaping element with dark current present equals the voltage output by the shaping element without dark current present.

In a further preferred embodiment of the invention, the compensation unit further comprises a baseline restorer circuit. By employing a baseline restorer circuit, a baseline shift can be mitigated. Further, baseline restoration reduces disadvantageous effects of low-frequency disturbances (e.g., power-line hum and vibrational microphonics).

In a further preferred embodiment of the invention, the detection device further comprises: a baseline restorer circuit, a switching network comprises first, second, third, and fourth switches, wherein the baseline restorer circuit is coupled between the first and second switches; and a current mirror. The detection device is operable in a first and a second mode. In the first mode, the first and second switches are closed so that the baseline restorer circuit is operable, the third switch couples a drain of the second transistor to the current mirror, and the fourth switch couples a drain of the first transistor to ground. In the second mode, the first and second switches are open, so that the baseline restorer circuit is disconnected and the third switch couples the drain of the second transistor to the drain of the first transistor. In the first mode, photoconductive gain is measured by measuring a compensation current via the current mirror. The second mode corresponds to normal operation.

In a further preferred embodiment of the invention, the detection device further comprises a fourth current source. The fourth current source is coupled between a drain of the second transistor and a drain of the first transistor. Preferably, the fourth current source is controlled by an output of the digital-to-analog converter so that the fourth current source may drain just the right amount of current so that the shaping element measures the photocurrent only.

In a further preferred embodiment of the invention, the detection device further comprises a digital-to-analog converter and an integrating channel, wherein the digital-to-analog converter is coupled between an output of the integrating channel and a control input of the fourth current source. The integrating channel may be used to determine the correct compensation current. The integrating channel's output may be provided to the digital-to-analog converter, which then, e.g., controls the fourth current source.

In a further preferred embodiment of the invention, the compensation unit comprises a baseline restorer circuit and a polarization determination unit. The polarization determination unit is adapted to determine a degree of polarization within the sensor from a baseline restorer current from the baseline restorer circuit. Thus, the idea of this preferred aspect is to detect or monitor the BLR feedback signal in order to use this to determine the grade of polarization within the sensor for every read-out impinging photon of the detector.

In a further preferred embodiment of the invention, the polarization determination unit further comprises an integrator circuit, wherein the integrator circuit is adapted to integrate a baseline restorer current from the baseline restorer circuit and to provide the baseline restorer current to the input of the shaping element. One reason for using an integrator is that the integrated signal is the mean or average of the BLR signal during the readout. For instance, the mean of the BLR signal during a readout period represents a good value to be monitored. Another candidate is the median of the BLR signal during a readout period.

In a further preferred embodiment of the invention, the compensation unit comprises a baseline restorer circuit and a limiter circuit. The limiter circuit is coupled between the output of the shaping element and the input of the baseline restorer circuit. The limiter circuit preferably filters out unwanted signals that will only cause baseline shift artifacts and therewith ignores any unwanted positive amplitude events, preventing a peak detector in the baseline restorer circuit to erroneously estimate the baseline level. A further preferred implementation could deal with negative amplitudes. So generally speaking, one idea is to ignore any signal that has the opposite polarity than the expected shaper signal in reaction to a sensor transient response (which is free of other artefacts).

In a further preferred embodiment of the invention, the limiter circuit is adapted to block provision of the electrical pulse to the baseline restorer circuit, if the electrical pulse is above a predetermined threshold. According to this preferred aspect, the limiter circuit clips any excursion of the shaping element's signal above the baseline caused, e.g., by induced pulses from neighboring pixels or by shaper overshoot.

In a second aspect of the invention, there is provided a detection method for detecting photons emitted by a radiation source by a detection device during a first time period, the detection method comprising: providing a sensor comprising an anode, a cathode and an intermediate direct conversion material for converting photons into electrons and holes, providing a photoconductive gain for said sensor, converting a charge pulse generated by a photon into an electrical pulse, providing a current from said sensor during at least a second time period, wherein said second time period is shorter than said first time period, and providing a compensation signal based on the current from said sensor and on the photoconductive gain for said sensor. The described detection method compensates for artifacts due to inherent errors with direct conversion detectors (such as, e.g., persistent currents or overshoots). Artifacts are reduced e.g. by determining a compensation current from the measured total pixel current and the photo-conductive gain, by detecting or monitoring a baseline restorer feedback signal to determine a degree of polarization within the sensor for every read-out of the detector, or by including a circuit at the input of a baseline restorer circuit that ensures that any signal above the baseline level is ignored.

In a further preferred embodiment of the invention, providing a compensation signal comprises determining a degree of polarization within the sensor from a baseline restorer current. The idea of this preferred aspect is to detect or monitor the BLR feedback signal in order to use this to determine the grade of polarization within the sensor for every read-out impinging photon of the detector.

In a further preferred embodiment of the invention, providing a compensation signal comprises: providing the electrical pulse to a limiter circuit and providing the electrical pulse to a baseline restorer circuit if the limiter circuit determines that the electrical pulse is below a predefined threshold. The limiter circuit preferably filters out unwanted signals that will only cause baseline shift artifacts and therewith ignores any unwanted positive amplitude events, preventing a peak detector in the baseline restorer circuit to erroneously estimate the baseline level.

In a further aspect of the invention, there is provided a detection device for detecting photons emitted by a radiation source. The detection device comprises a sensor comprising an anode, a cathode and an intermediate direct conversion material for converting photons into electrons and holes, a shaping element adapted to convert a charge pulse generated by a photon into an electrical pulse, and a compensation unit coupled between an output of the shaping element and an input of the shaping element. The compensation unit is adapted to provide a compensation signal based on the electrical pulse. The compensation unit comprises a baseline restorer circuit and a polarization determination unit, wherein the polarization determination unit is adapted to determine a degree of polarization within the sensor from a baseline restorer current from the baseline restorer circuit.

In an embodiment, the polarization determination unit further comprises an integrator circuit, wherein the integrator circuit is adapted to integrate a baseline restorer current from the baseline restorer circuit and to provide the baseline restorer current to the input of the shaping element.

In a further aspect of the invention, there is provided a detection device for detecting photons emitted by a radiation source. The detection device comprises a sensor comprising an anode, a cathode and an intermediate direct conversion material for converting photons into electrons and holes, a shaping element adapted to convert a charge pulse generated by a photon into an electrical pulse, and a compensation unit coupled between an output of the shaping element and an input of the shaping element. The compensation unit is adapted to provide a compensation signal based on the electrical pulse. The compensation unit comprises a baseline restorer circuit and a limiter circuit. The limiter circuit is coupled between the output of the shaping element and the input of the baseline restorer circuit.

In an embodiment, the limiter circuit is adapted to block provision of the electrical pulse to the baseline restorer circuit, if the electrical pulse is above a predetermined threshold.

It shall be understood that the detection device of claim 1 and the detection method of claim 12 have similar and/or identical preferred embodiments as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
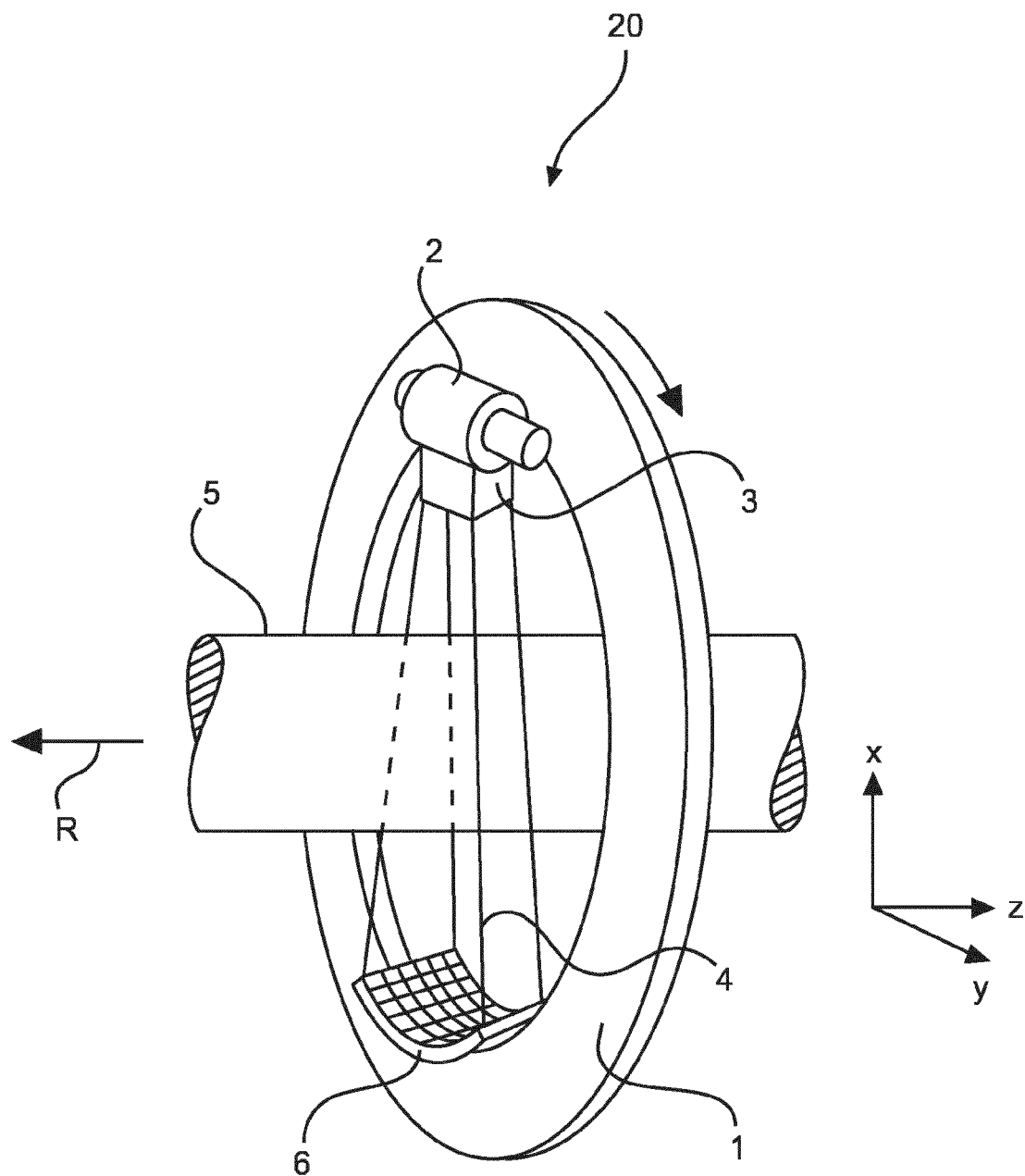
FIG. 1 shows schematically and exemplarily an embodiment of a projection data generation system.

FIG. 1 shows schematically and exemplarily an embodiment of a projection data generation system 20 for generating projection data of an object. In this embodiment the projection data generation system is a computed tomography system. The computed tomography system 20 includes a gantry 1, i.e. a rotor, which is capable of rotation with respect to a stator (not shown in FIG. 1) about a rotational axis R, which extends parallel to the z direction. A radiation source 2 being, in this embodiment, an x-ray tube is mounted on the gantry 1. The radiation source 2 is provided with a collimator 3, which forms, in this embodiment, a conical radiation beam 4 from the radiation generated by the radiation source 2. The radiation traverses the object (not shown), such as a patient, in an examination zone 5. After having traversed the examination zone 5 the radiation beam 4 is incident on a detector 6 mounted on the gantry 1.

The detector 6 is adapted to generate a detection signal depending on the detected radiation and to generate the projection data, i.e. detection values, depending on the generated detection signal. While detecting the radiation the gantry 1 rotates around the examination zone 5 such that the projection data can be acquired in different acquisition directions.

Figure 2:
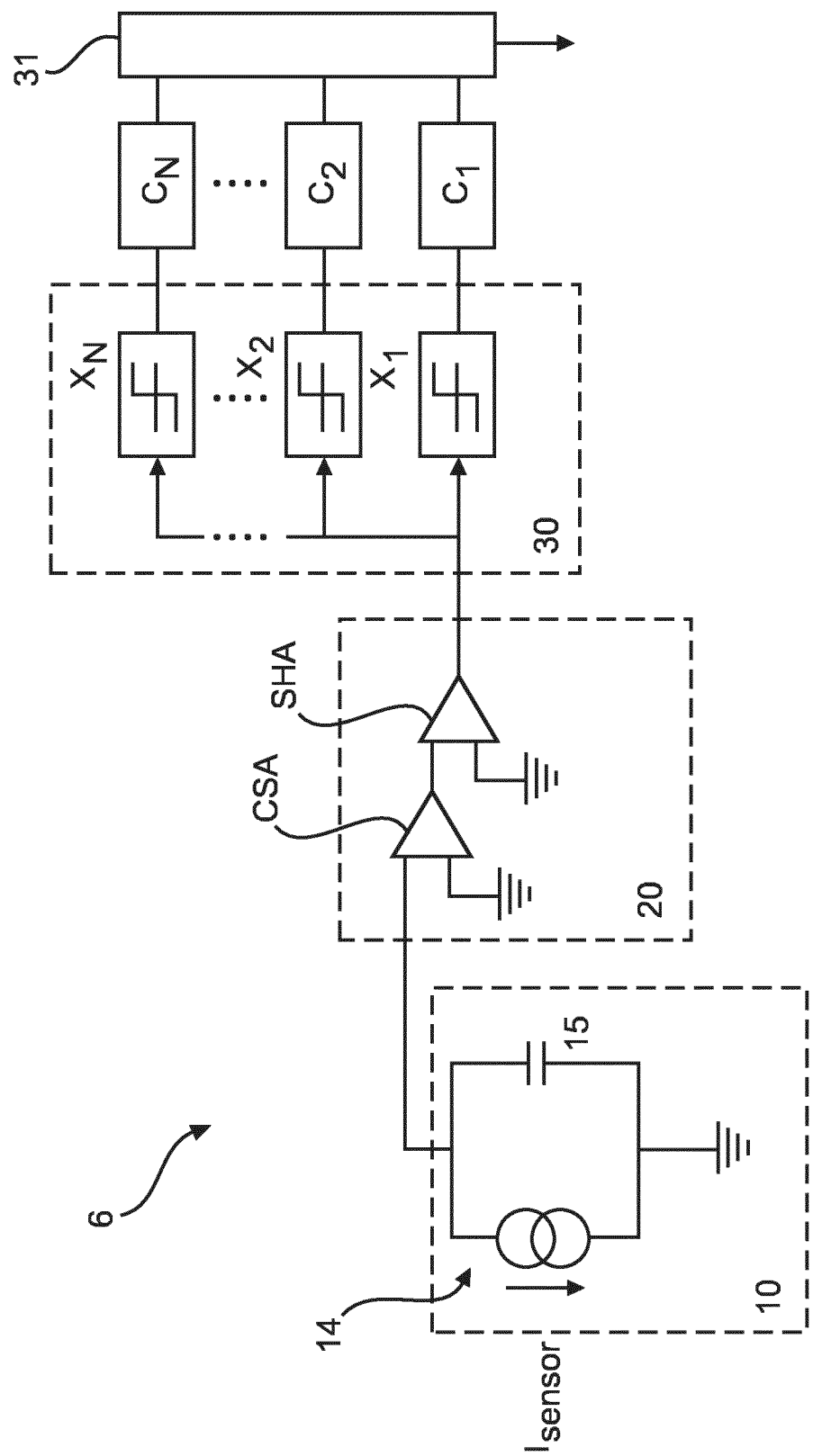
FIG. 2 shows schematically and exemplarily an embodiment of a detection device for detecting photons emitted by a radiation source.

FIG. 2 shows schematically and exemplarily an embodiment of a detection device 6 for detecting photons emitted by a radiation source 2 (as shown, for example, with reference to FIG. 1). The detection device 6, which, in this embodiment, is a photon counting detection device, comprises a plurality of pixels each including a radiation sensitive sensor 14. The radiation sensitive sensor 14 of a pixel detects photons emitted by a radiation source 2 and generates a corresponding electrical signal, such as an electrical current or voltage signal, for each detected photon. Examples of suitable sensor types include direct conversion sensors, such as cadmium zinc telluride (CZT) based sensors, and scintillator based sensors that include a scintillator in optical communication with a photosensor. The electrical signal generated by the radiation sensitive sensor 14, in this embodiment, an electrical current signal $I_{sensor}$, is passed to a shaping element 20 comprising a pre-amplifying unit CSA (such as, e.g., a charge-sensitive amplifier) of the pixel, which converts a charge pulse generated by a photon into an electrical signal. The radiation sensitive sensor 14, in this embodiment, has an equivalent pixel capacitance 15. In other embodiments, DC coupling can be used, resulting in both the DC and the AC portion of the electrical current $I_{sensor}$ being passed to the pre-amplifying unit CSA. The pre-amplifying unit CSA (such as, e.g., a charge-sensitive amplifier), in this embodiment, is implemented as an operational amplifier CSA. In this embodiment, shaping element 20 further comprises a shaper SHA. The electrical signal generated by the pre-amplifying unit CSA is passed to shaper SHA. Shaper SHA converts the electrical signal into an electrical pulse. In this embodiment, shaper SHA comprises an operation amplifier. In a further preferred embodiment, shaper SHA comprises a CR-RC filter network.

The electrical pulse generated by the shaping element 20 is passed on to an energy determination unit 30 of the pixel which determines the energy of the detected photon. In this embodiment, energy determination unit 30 is implemented as an energy discriminator which energy-discriminates the detection pulse signal by comparing its amplitude to one or more energy thresholds $X_1, X_2, \ldots, X_N$. For this purpose, energy determination unit 30 may comprise, in this embodiment, one or more comparators. Each of the one or more comparators carries out a comparison of the electrical pulse generated by shaping element 20 to a respective energy threshold $X_1, X_2, \ldots, X_N$. If the detection pulse signal exceeds a respective energy threshold $X_1, X_2, \ldots, X_N$, a corresponding counter $C_1, C_2, \ldots, C_N$ is incremented and, at the end of a frame period, the number of counts corresponding to each respective energy interval is read-out from the counters $C_1, C_2, \ldots, C_N$ via read-out line 31.

In the following, techniques are proposed to reduce artifacts due to inherent errors with direct conversion detectors in spectral CT by determining a compensation current from the measured total pixel current and the photo-conductive gain;

detecting or monitoring a base-line restoration feedback signal to determine the grade of polarization within the sensor for every read-out of the detector; and/or including a circuit at the input of the baseline restorer circuit that ensures that any signal above the baseline level is ignored.

According to a first embodiment, which is described herein below, it is proposed to derive from the measured total pixel current and the determined photo-conductive gain (known from measurements), the compensation current, which is then provided by a current source.

Photoconductors with not fully blocking contacts exhibit a photoconductive gain PCG, i.e. the measured current when irradiated is much higher than the current, which results, if only the electron-hole pairs generated by impinging photons (optical or X-ray or other types) are considered, which current is called photocurrent $I_{photo}$.

This also applies to direct conversion semiconductors like cadmium telluride (CdTe) and cadmium zinc telluride (CZT) currently investigated as conversion material for X-ray detectors to count individual X-ray photons for human computed tomography (CT) imaging. Note that any direct converting material with different transit times for holes and electrons will be polarized at a certain flux, as charge with the longer transit time will be accumulated in the material and cause polarization. Therefore, the invention is also applicable to, e.g., GaAs.

The reason for the photoconductive gain in CdTe and CZT mainly goes back to the presence of hole traps, and the fact that the mobility of holes is about a factor of ten smaller than that of the electrons, where the deep traps are more important than the shallow traps, see Spieler, Semiconductor Detector Systems: When an X-ray photon interacts with the material and generates a cloud of electron pairs, the applied external electric field separates electrons and holes, and the electrons drift towards the anode, while the holes drift towards the cathode. Due to the difference in mobility the electrons reach the anode much faster. This means that when the electrons reach the anode, usually there are still all of the holes in transition towards the cathode. Furthermore, due to the hole traps, holes are trapped, and it takes much longer for them to reach the cathode than just the time given by the hole mobility and the field strength. As a consequence, when the electrons have reached the anode, the bulk is no longer electrically neutral, which—in a very simple model (see, for example, Sze, N G, *Physics of Semiconductor Devices*, Wiley 2007, section 13.2)—is considered the reason for the injection of electrons at the cathode side (to enforce electrical neutrality), if the cathode is not fully blocking the injection of electrons: As long as there are trapped holes or holes on transition towards the cathode, while the "mating" electrons already have reached the anode, electrons are injected from the cathode and move, forced by the applied electric field, towards the anode.

Hence, the photoconductive gain PCG is approximately proportional to the quotient of the "average lifetime of a hole until recombination" and the "transition time of an injected electron from the cathode to the anode", and it is therefore a characteristic property of the considered crystal (or even of the considered volume within the crystal). As long as there is a hole trapped, an electron is injected, if charge neutrality is violated. Thus, the additional current is proportional to the average hole life-time and inversely proportional to the transition time of an injected electron (the longer the hole is trapped and the shorter the electron transition time, the more electrons are injected).

The portion of the current, which is observed in addition to the photocurrent $I_{photo}$, is called persistent current $I_{persistent}$. It is $$PCG = 1 + \frac{I_{persistent}}{I_{photo}}, \quad (1)$$

where PCG=1 denotes the case that there is no charge injection at all, i.e., the persistent current $I_{persistent}$ disappears.

In this simple model, the persistent current is considered proportional to the X-ray flux as well as its mean energy, which is also the case for the photo current. Hence, in this simple model the photo-conductive gain PCG does not depend on X-ray flux and mean energy, and merely on material related properties (such as, e.g., the number of deep traps or the "average lifetime of a hole until recombination") as well as on the cathode voltage, which determines the "transition time of an injected electron from the cathode to the anode".

If Cd[Zn]Te with not fully blocking contacts is used for single photon counting detectors, the photoconductive gain causes a major problem especially for DC coupled readout electronics: Since the persistent current as a consequence of the photo-conductive gain is a slowly changing current on top of the photocurrent, it causes a baseline shift at the output of the analog readout channel towards the set energy thresholds so that, without any correction means, the energies of the photons are wrongly registered. It is noted that "slow" only refers to a lower frequency content than the photon flux. It also follows from the simple model discussed above: The detrapping of holes is governed by the sojourn time within the trap, which follows a negative exponential distribution with a certain time-constant. Many holes have to be trapped in order to cause a sizeable additional current, the time constants differ between traps, and usually hole traps have relatively long detrapping times (i.e., sojourn time in a trap)

If the persistent current changes slowly, and pile-up is limited, known approaches like a conventional baseline restorer (BLR) can be applied.

It is well-known that the conventional BLR approach of sensing the baseline (BL) at the output of the shaper (SHA) will result in significantly wrong baseline estimates, if pulses at the output of the SHA pile-up frequently: In this case, the baseline (BL) is no longer reached so the BL is wrongly estimated.

Such effects have been observed with CZT material with so-called semi-blocking contacts, where "semi-blocking contacts" allow for some injection of electrons from the cathode—yet less so than "non-blocking" contacts. If low-energy photons are not filtered out (e.g. by a 3 mm thick Cu filter), the high rate of especially low-energy photons causes the baseline (BL) to be reached so rarely that the baseline restorer (BLR) circuit cannot restore the baseline (BL). An additional effect may be caused by induced pulses from neighbor pixels, which have a bipolar waveform. Depending on the phase of an induced pulse relative to the signals of real pulses, the induced pulse can contribute to pile-up or reduce the pile-up visible on the shaper (SHA) output signal.

Figure 3:
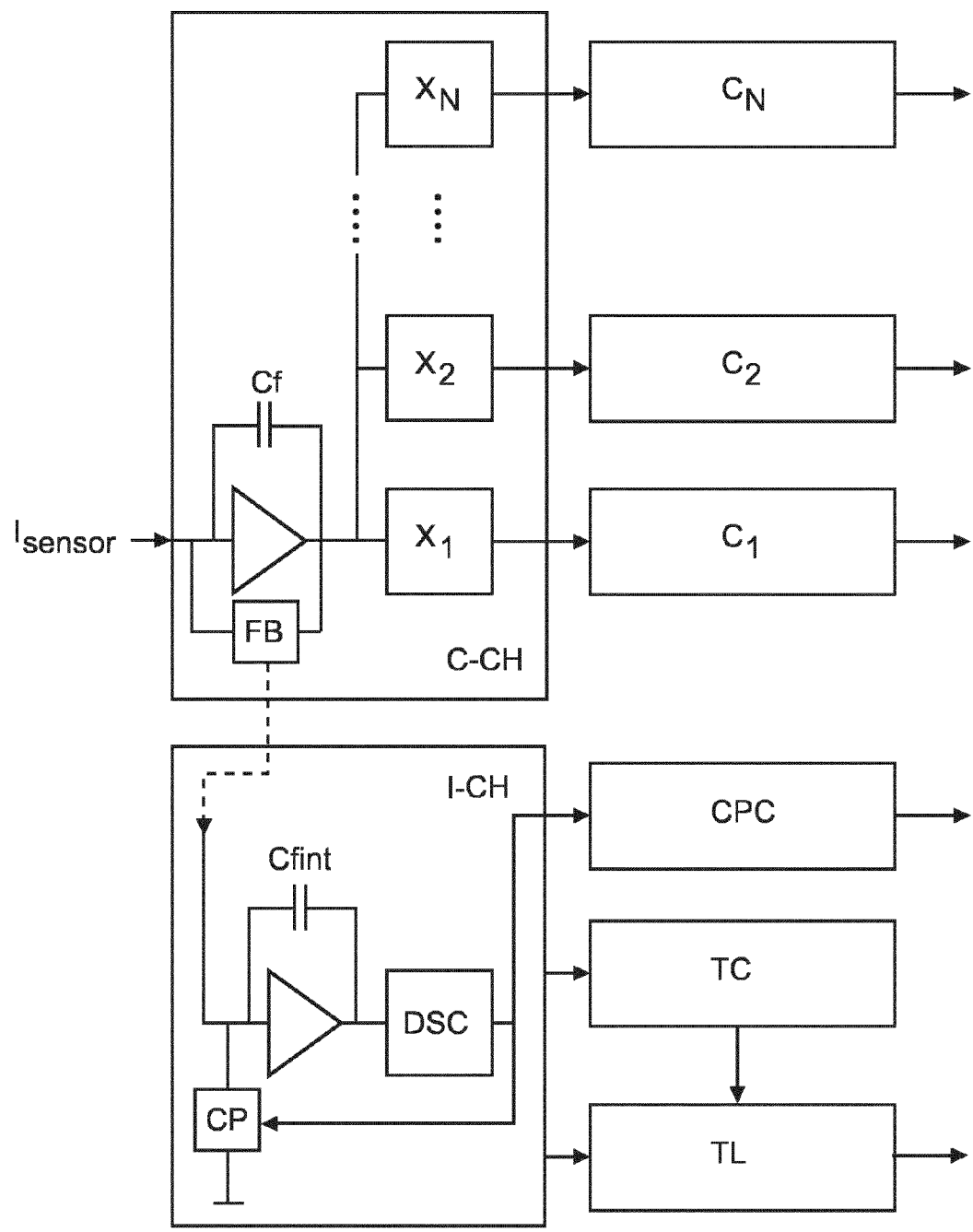
FIG. 3 shows schematically and exemplarily an embodiment of a circuit for simultaneously counting and integrating the x-ray signal.

Since the photoconductive gain is a property of the particular volume within the direct conversion material, it is a characteristic of each pixel in a direct conversion X-ray sensor made of CdTe or CZT. In a first embodiment, it is therefore proposed to determine the photoconductive gain for each pixel of a Cd[Zn]Te pixel sensor beforehand, to measure in addition to the number of individual photons in each measurement period (MP) also the electrical current observed in each pixel, however in sub-MP intervals (this is possible applying the analog front-end as discussed by the CIX concept described in WO2007010448A2, also depicted in FIG. 3, illustrating simultaneously counting and integrating of the X-ray signal), and to derive, from the measured total pixel current $I_{total}$ and the (known) photo-conductive gain PCG, the compensation current as described in the following, which is then provided by a current source. Since the compensation should be fast enough, sub-MP intervals are used for measuring the pixel current. The time constant for the resulting feedback loop is in the same range as with a conventional BLR (ms-range), since the persistent current $I_{persistent}$ is considered slowly changing. Note that "slowly" means: slowly relative to the current fluctuations caused by the pulse train, e.g. only containing frequencies below 1 kHz.

This approach may also allow for dealing with material behavior different from the described simple model, i.e. that the persistent current depends on the mean X-ray energy in a non-linear way while the signal current depends linearly on the mean X-ray energy. If that turns out to be the case, one can measure the photoconductive gain for different mean energies $E_{mean}$ of the incident X-ray flux under different mean energy photo-current conditions and thus set up a look-up table $PCG=f(E_{mean})$ to describe PCG as a function $f$ of $E_{mean}$. The mean energy $E_{mean}$ is easily available from the two measurements in the counting and the integrating channel. In this regard, note that in FIG. 3, the upper row corresponds to the counting channel, whereas the lower row corresponds to the integrating channel. Thus, for each sub-MP the mean energy $E_{mean}$ can be measured to determine the photo-conductive gain PCG for the next sub-MP.

FIG. 3 shows the circuit architecture of the components in an analog front-end as discussed by the CIX concept described in WO2007010448A2. The electric signals generated by the sensor are applied to an input pre-amplifier Cf. The input pre-amplifier Cf converts the sensor signals into a different signal (for example, a voltage signal). It may be a charge sensitive amplifier (CSA), that is, typically an integrated circuit which includes a bleeding resistor. For each brief charge pulse at the input of pre-amplifier Cf, an exponentially decreasing voltage is produced at the output, the surface area below this exponential curve being proportional to the charge within the pulse.

In order to have multiple threshold counting functionality, a plurality of discriminators $X_1$ to $X_N$ are connected to the output of preamplifier Cf. Each of the discriminators may consist of a signal shaping amplifier and a comparator with an adjustable threshold value and generates a digital output signal (counting pulse) for each charge pulse from the sensor which is larger than a predetermined quantity of charge.

The lowest threshold (which may be implemented by discriminator $X_1$) distinguishes counts generated by photons with minimum energy from counts generated by noise (e.g. electronic noise). The higher thresholds can be used for K-edge imaging. For example, with two discriminators, discriminator $X_2$ may represent a threshold which corresponds to pulse sizes generated by the pre-amplifier Cf in response to sensor signals, which were generated by photons above the energy (K-edge energy), at which the K-edge of the used contrast medium is found.

In order to determine the photons with energy below the K-edge energy, the difference between the values of event counter $C_2$ and event counter $C_1$ is computed, while the photons with energy above the K-edge energy are given by the value of event counter $C_2$. The counters $C_1$ to $C_N$ may be electronic digital counters with a counting depth of n bits. Linearly fed back shift registers may be used to save space.

An integrating channel I-CH receives a signal from a feedback loop FB of preamplifier Cf and may be an "overall signal acquisition circuit" which detects the total quantity of charge indicated by the sensor signal during an integration period. This circuit may be realized by an integrator circuit with an analog output, and a voltage/frequency converter, or it may be realized in some other manner.

Using the additional integrating channel I-CH rather than only a number of different counting channel (which would result in an energy resolving pulse counter) may be seen in the fact that the integration is done over the whole energy range so that the evaluation will not be quantum-limited, while this could well occur for some of the bins of an energy resolving pulse counter, especially if the energy-bin size is small, i.e. only few photons are counted per energy bin on average.

Charge packet counter CPC and time counter TC determine an optimized estimation for the electrical charge generated during a measurement interval marked by time latch TL, which charge is proportional to the energy deposited by X-rays during the measurement interval. The count of the counters $C_1$ to $C_N$, and the result of the integration in integrating channel I-CH are provided to a data processing unit (not shown). The data processing unit can thus evaluate the results of the counting channel as well as the integrating channel. This arrangement enables a large dynamic range of the X-ray detector, because the more exact results of the counting channel can be used in the case of small quantum flows whereas in the case of large quantum flows the integrator channel that is more exact for large flows can be utilized.

Figure 4:
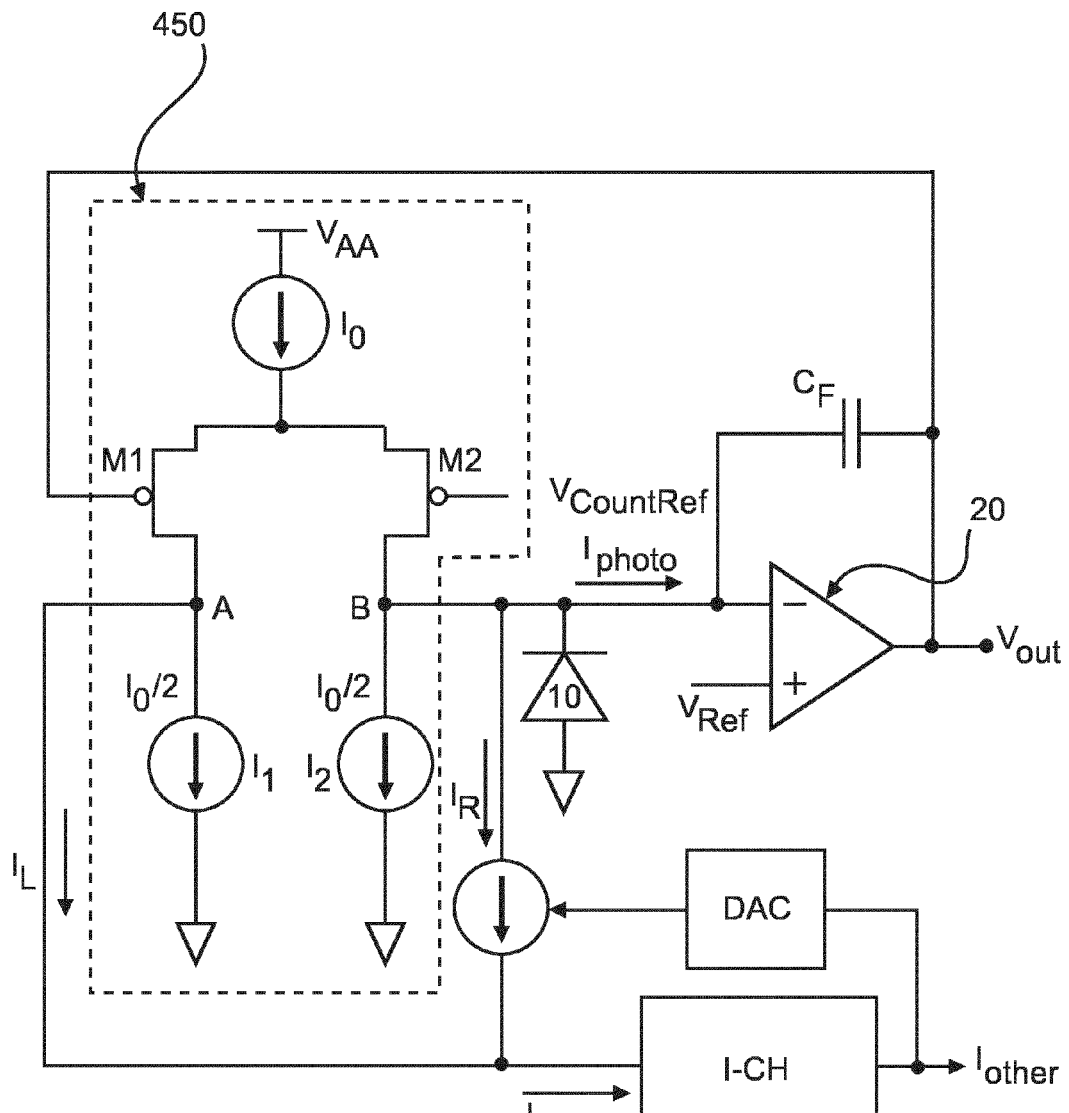
FIG. 4 shows schematically and exemplarily an embodiment of a circuit that subtracts the persistent current estimated from the total measured current based on the known photo-conductive gain.

FIG. 4 depicts a sketch of the circuit for deriving the compensation current from the measured pixel current, i.e., the schematics of a circuit that subtracts the persistent current estimated from the total measured current based on the known photo-conductive gain PCG. In this embodiment, compensation unit 450 comprises a differential pair formed by current source $I_0$, p-MOSFETs M1, M2, and current sources $I_1$, $I_2$, and their interconnect.

Current source $I=f(I_{total},PCG,I_{dark})$ implements the correct conversion factor to obtain the persistent current from the measured total current given the known photo-conductive gain PCG. According to eq. (1), where $I_{total}=I_{photo}+I_{persistent}$, simple algebra provides:

$$I_{persistent} = I_{total}\left(1 - \frac{1}{PCG}\right) \qquad (2)$$

It is assumed, for simplicity, that the sensor does not provide any dark current, i.e. $I_{dark}=0$. However, there will always be some dark current. The presence of dark current entails additional noise, which cannot be compensated. Hence, the allowable amount of dark current is determined by this noise relative to the photo current. That is also why the PCG should be low, since the persistent current also has a noise component. For CT applications a few nA/mm² should be acceptable. Without any other current coming from sensor 10, M1 and M2 see the same drain current $I_0/2$, which is enforced by the two current sources $I_1$ and $I_2$. In this situation, also $V_{out}=V_{Count\ Re\ f}$ ($C_F$ carries the initial charge of $Q_0=C_F(V_{out}-V_{count\ Re\ f})$), and the voltage across $C_F$ equals $V_{out}-V_{Re\ f}$. The integrating channel "I-channel" I-CH would measure an average current of zero. Hence, digital-to-analog converter DAC will output zero so that the current source $I=f(I_{total},PCG,I_{dark})$ will not drain any current, i.e. $I_R=0$ (note that the "R" in $I_R$ refers to the current in the right branch of FIG. 4).

As soon as the sensor generates a current (a pulse train representing the photo-current $I_{photo}$ due to converted X-ray photons accompanied by a persistent current), the photo-current will also flow in the left-branch current $I_L$ (note that the "L" in $I_L$ refers to the current in the left branch of FIG. 4), and be measured by the I-channel I-CH. (Any positive charge pulse that charges $C_F$ causes $V_{out}$ to become smaller than $V_{Count\ Re\ f}$, i.e. the gate voltage of M1 decreases compared with equilibrium so that the M1 drain current increases causing $I_L$ to increase; at the same time the M2 drain current decreases by the same amount so that current has to flow into node B; this process stops only when $C_F$ is again recharged to the initial charge $Q_0$. The charge provided in $I_L$ matches exactly the charge that is needed to recharge $C_F$ to the initial charge $Q_0$.) Hence the DAC will produce a non-zero output, which configures the current source $I=f(I_{total},PCG,I_{dark})$ to drain exactly the persistent current (assuming the correct photo-conductive gain PCG is known), so that the input node of the differential amplifier only sees the photocurrent $I_{photo}$. For this purpose, if $I_{dark}=0$, it is according to eq. (2)

$$f(I_{total}, PCG, I_{dark}) = I_{total}\left(1 - \frac{1}{PCG}\right).$$

Note that, due to the properties of a differential pair, any DC current that is generated by the sensor, will be drained by the right branch of the differential pair: $V_{out}$ will change to such a value that the drain current of M1 takes on a value such that the drain current of M2 allows for accommodating this DC current from the sensor: Assuming that the sensor generates a positive DC current $I_{sensor,a}$ flowing into node B, the current through M2 will be reduced by $I_{sensor,a}$, which can only happen, if the gate voltage of M1 (and therefore $V_{out}$) changes such that the drain current through M1 increases by $I_{sensor,a}$. Consequently, this surplus current has to leave node A, i.e. $I_L=I_{sensor,a}$, since the current source $I_1$ enforces a current $I_0/2$ in the bottom of the left branch of the differential pair. Thus, without X-ray irradiation, also the dark current will be visible at the input of I-channel. Hence, by using the current source $I=f(I_{total},PCG,I_{dark})$ it is possible to fully compensate the dark current. The I-channel I-CH measures a current sum $I_L+I_R$, i.e. if there is only a dark current present. The output of the I-channel will determine the dark current correctly, no matter which part of it is visible in the left or right branch of the differential pair. Hence, the dark current is fully compensated, if $V_{out}$ with dark current present equals $V_{out}$ without dark current present (which in both cases means $V_{out}=V_{Count\ Re\ f}$, if there is no transistor mismatch or offset of the operational amplifier).

While the I-channel is needed here to determine the correct compensation current, the measurement result $I_{other}$ of the I-channel can be used for other purposes, e.g. to implement the CIX idea of WO2007010448A2. For this purpose, the photo-current needs to be known, which can also be determined from the measured total current, if the PCG is known:

$$I_{photo}=I_{total}/PCG.$$

This equation may be derived from the relation $I_{total}=I_{photo}+I_{persistent}$, and from eq. (2) as follows:

$$I_{photo} = I_{total} - \underbrace{I_{persistent}}_{=I_{total}(1-\frac{1}{PCG})} = I_{total}\left(1 - \left(1 - \frac{1}{PCG}\right)\right) = \frac{I_{total}}{PCG}.$$

In the following, using a conventional baseline restorer circuit BLR to measure the photo-conductive gain (PCG) is described.

The photo-conductive gain (PCG) has to be known for each pixel individually. Hence, the best option is, to measure photo-conductive gain PCG per pixel. This can be done by using a conventional baseline restorer circuit BLR under low flux (i.e. this BLR works without problems), and measuring the compensation current $I_{comp}$ that the BLR provides. This current corresponds to the persistent current $I_{persistent}$. Furthermore, the photo-current $I_{photo}$ has to be measured, while the BLR is switched on. From the measured $I_{comp}$ and the measured $I_{photo}$ the PCG can be computed from eq. (1), $$PCG = \frac{I_{comp}}{I_{photo}} + 1,$$

where $I_{comp}$ corresponds to the persistent current.

Figure 5:
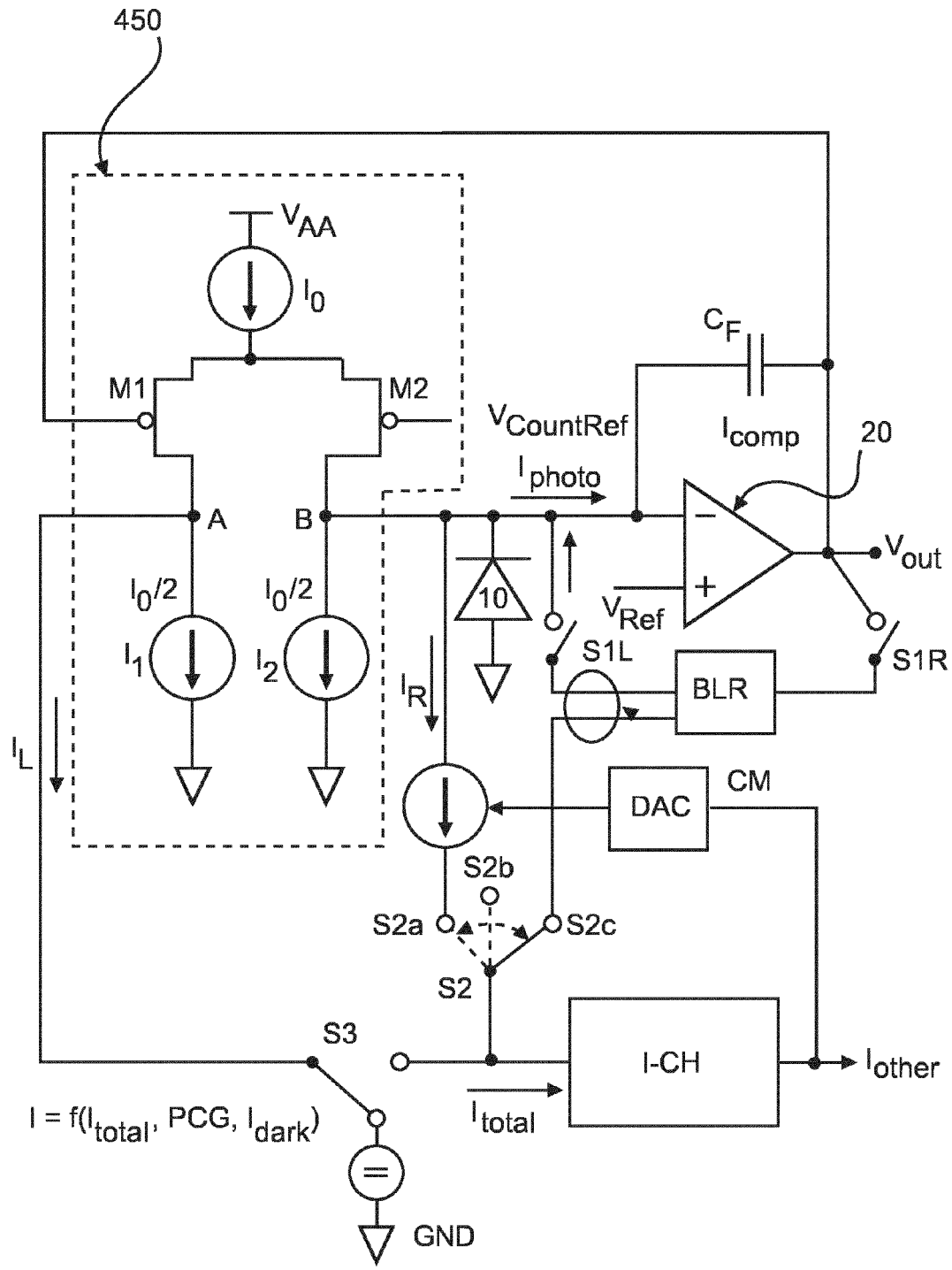
FIG. 5 shows schematically and exemplarily an embodiment of a circuit including a baseline restorer circuit, with which the photoconductive gain can be measured before normal operation.

FIG. 5 shows an example of a circuit including a baseline restorer circuit BLR, with which the photo-conductive gain PCG can be measured before normal operation. The circuit adds a conventional BLR and a small switching network, which allows configuring the circuit for two modes (a) and (b):

(a) measuring the photo-conductive gain PCG: the switches S1L and S1R are closed, so that the BLR can be used; switch S2 is in position S2c to measure a current $I_{comp}$ (via the current mirror CM), with S3 connecting the left branch to ground GND (via a voltage source to keep the correct potential of node A), and in position S2b to measure $I_{photo}$, while S3 connects the left branch to I-channel I-CH.

(b) normal operation: switches S1L and S1R are open, i.e. the BLR is disconnected, and S2 is in position S2a. S3 connects the left branch of the differential pair to I-channel.

Only in this mode, the digital-to-analog convertor DAC is operational and controls the current source $I=f(I_{total}, PCG, I_{dark})$.

In the following, a comparison with other approaches is presented. By using bi-polar shaping waveforms and AC coupling of the input node any slowly changing background current can be compensated rather easily. However, drawbacks are that the pulse duration of bipolar waveforms is in general longer than that of unipolar pulses, and the superposition of bi-polar pulses results in rather unpredictable waveforms. Furthermore, the AC coupling capacitor has to be large in order to avoid suppression of high frequency signal components. Such capacitors need a large area in a CMOS ASIC and are required per pixel.

According to a second embodiment, which is described herein below, it is proposed to detect or monitor the BLR feedback signal in order to use this to determine the grade of polarization within the sensor for every read-out impinging photon of the detector.

The effect of polarization in semiconductor x-ray sensor materials (e.g. CZT or CdTe) degrade the spectral performance of the detector as the collected charge at the pixelated cathode is decreased with increasing amount of polarization. FIG. 4(b) of Bale and Szeles, *Nature of polarization in wide-bandgap semiconductor detectors under high-flux irradiation: Application to semi-insulating $Cd_{1-x}Zn_xTe$*, Phys. Rev. B 77, 035205 (2008), illustrates the resulting shift of the measured spectrum at four increasing flux rates (tube currents). The distortion of a detected pulse height spectrum as a function of the tube current is depicted. With increasing flux or tube current the spectrum gets shrunk.

Therefore the detected pulse height of an x-ray event inside the sensor material is smaller in presence of polarization as in its absence. FIG. 1 of Bale and Szeles, *Electron transport and charge induction in cadmium zinc telluride detectors with space charge build up under intense x-ray irradiation*, J. Appl. Phys. 107, 114512 (2010), illustrates simulated preamplified signal induction, together with the resulting high-order shaped signal output for an increasing flux. With increasing amount of polarization the pulse height of an x-ray event after the shaper decreases. The pulse shape is also altered.

Figure 6:
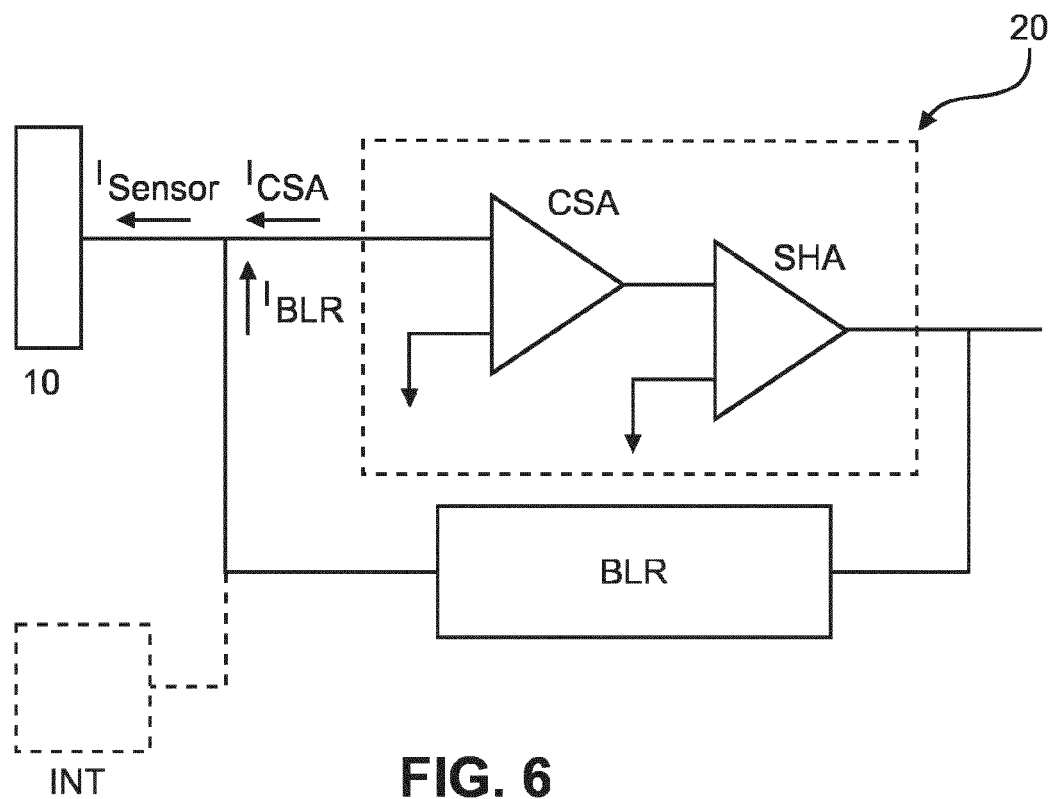
FIG. 6 shows schematically and exemplarily an embodiment of a circuit for monitoring a baseline restorer feedback signal to determine the degree of polarization within the sensor.

Polarization is caused by trapped or accumulated charge inside the sensor weakening the applied electric field, which degrades the charge transport properties. Additionally an increased bias or dark current arises which is proportional to the amount of additional charge in the sensor, even in the case when blocking contacts are used. This dynamic current can be compensated by using a so called baseline restorer (BLR) circuit (see FIG. 6).

It is proposed to detect or monitor the BLR feedback signal in order to use this to determine the grade of polarization within the sensor for every read-out (IP) of the detector.

This information can be used either for quality issues or for correction of the detected counts. The last mentioned can be carried out after the measurement or during the measurement by shifting the thresholds proportional to the BLR output signal.

Depending on implementation, the BLR may also be affected by pile-up at high flux conditions. To this end, the pile-up model for the considered electronics can be used to differentiate how much of the current integrated from the BLR output corresponds to polarization and how much to a shift due to high pile-up conditions. Note that, for building a pile-up model it is necessary to understand how the implemented BLR circuit reacts, more specifically, how the value of the output voltage changes, when a signal comprising pulses with same amplitude A and certain amount of pile-up (incoming flux rate) are fed in. The dependence of the BLR output voltage on the Input Count Rate and on the pulse amplitude can be derived by Spice simulations or in an experiment using signals generated by an arbitrary waveform generator as input for the BLR. In a real acquisition the counted number of events in the bins can be used to estimate the ICR. The amplitude A can be estimated by the mean energy of the photons in the primary beam.

Even at low x-ray fluxes but long irradiation times the sensor gets polarized. This is the case during the energy calibration of the detector in which the correct threshold positions should be determined. Polarization distorts the calibration. If the BLR signals for each pixel and integrating period (IP) are available, then a proper setting for the calibration can be found and the accuracy of the calibration can be assessed. The energy calibration is a crucial step in the calibration of photon counting detectors.

The influence of polarization on the counting results of a photon counting detector can be assessed and calibrated in order to correct the counts for every integrating period (IP) (or readout period or view in CT) during or after the measurement. This will improve the spectral performance of the detector.

The BLR output signal needs to be integrated for every IP. An integrator (see FIG. 6) and additional components for transfer and storage of the signals need to be added. If the threshold positions are adapted to the current amount of polarization an appropriate circuit needs to be implemented. One reason for using an integrator is that the integrated signal is the mean or average of the BLR signal during the readout. For instance, the mean of the BLR signal during a readout period represents a good value to be monitored. Another candidate is the median of the BLR signal during a readout period.

According to a third embodiment, which is described herein below, it is proposed to include a circuit at the input of the baseline restorer circuit that ensures that any signal above the baseline level is ignored.

The use of cadmium zinc telluride (CZT) in spectral computed tomography (CT) applications requires mechanisms in order to compensate dynamic background current components, i.e. leakage currents (i.e. dark currents) and persistent currents caused by photoconductive gain PCG>1. To this end, for DC coupled readout schemes, baseline restorer circuits (BLR) are introduced to detect shifts of the baseline (BL) level at the output of the shaping element and inject/pull a current to correct for the aforementioned shift.

Baseline restorer circuits are typically implemented by using a peak detector that senses the baseline, a low pass filter (e.g. an integrator) to restrict to the compensation of low frequency BL shifts and (a) transconductor element(s) in charge of injecting or sinking a compensating current at the input node (or shaper input depending upon implementation). The peak detector within the BLR circuit is however very sensitive to excursions of the shaper output level in the opposite direction of the expected background current, particularly above the BL (in an implementation where the shaper output signal is a pulse below this BL). That is, a signal above the BL level will be sensed by the peak detector as if it were the new BL level, causing a correction equal to the full signal excursion above the BL level in the worst case. Such excursions above the BL level can primarily be caused by two non-ideal artifacts; namely induced pulses (which have a bi-polar shape around the BL level) from neighboring pixels and shaper overshoot (a small half wave above the BL level).

A method is proposed to ignore any such positive amplitude events, preventing the peak detector to erroneously estimate the BL level.

Circuit elements are introduced at the input node of the baseline restore circuit to filter out unwanted signals that will only cause baseline shift artifact.

Figure 7:
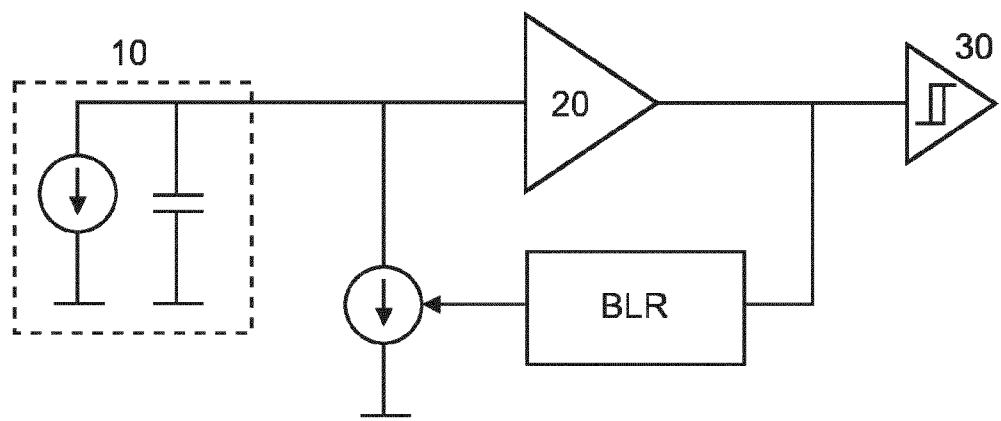
FIG. 7 shows schematically and exemplarily an example of a typical front-end channel having a baseline restorer circuit.

A generic photon counting channel with baseline restorer is shown in FIG. 7. Assuming that the output of shaping element 20 generates a negative pulse for regular incoming photons, any excursion of the shaper signal above the reference level (or baseline BL) may cause the baseline restorer circuit BLR to shift the output of shaping element 20. Thus, energy determination unit 30 will not measure the correct photon energy.

Figure 8:
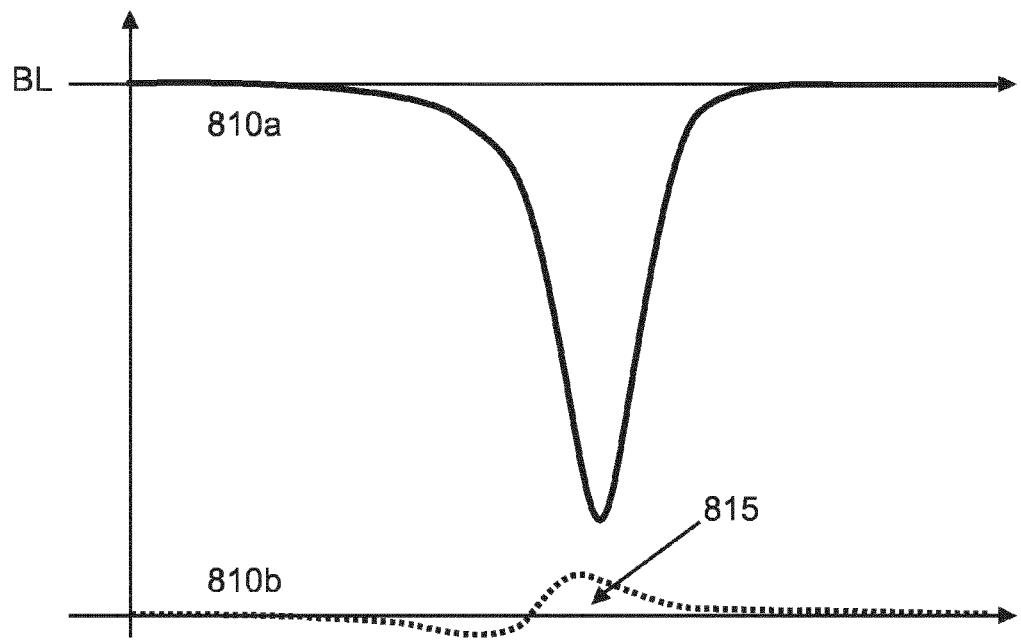
FIG. 8 shows schematically and exemplarily how a pulse in a center pixel may cause a bipolar signal in the neighboring pixel by induction.

FIG. 8 shows a situation that can cause unwanted baseline shifts. An X-ray photon impinging onto the considered pixel sensor element 810a will generate a negative pulse at the output of the shaper connected to this pixel. Neighboring pixels 810b however may also detect a signal caused by induction from the charge cloud moving in the considered pixel 810a. The induced charges will cause the shaping element (not shown) connected to the neighbor pixel 810b to produce a bipolar signal (indicated by arrow 815). The peak detector within baseline restore circuit BLR will sense the positive peak and cause baseline restore circuit BLR to pull current from the input, causing the output signal of shaping element 20 to be moved below the BL, which is not intended. The BL level is defined by the reference voltage of shaping element 20 (additional offset may be caused if an operational amplifier is used in shaping element 20). As a result, a new baseline (BL) is defined, which is below the true baseline (BL) thus causing errors in the energy estimation when the shaper output pulse is compared with fixed thresholds. (Note that this explanation assumes shaping element 20 to comprise a charge-sensitive amplifier CSA and a shaper SHA. The polarities mentioned depend on the circuit topology.)

Induction pulses are not the only artifact that can cause an undesired baseline shift. If shaping element 20 is not properly tuned, it might exhibit an overshoot which will also be sensed by baseline restorer circuit BLR and produce an unwanted shift of the shaper signal below the true baseline BL.

In this embodiment, it is proposed to include a circuit at the input of the baseline restorer circuit that ensures that any signal above the baseline level is ignored. The disturbance itself will be unaffected at the output of the shaper, but baseline restorer circuit BLR will simply not react to such non-idealities.

Figure 9:
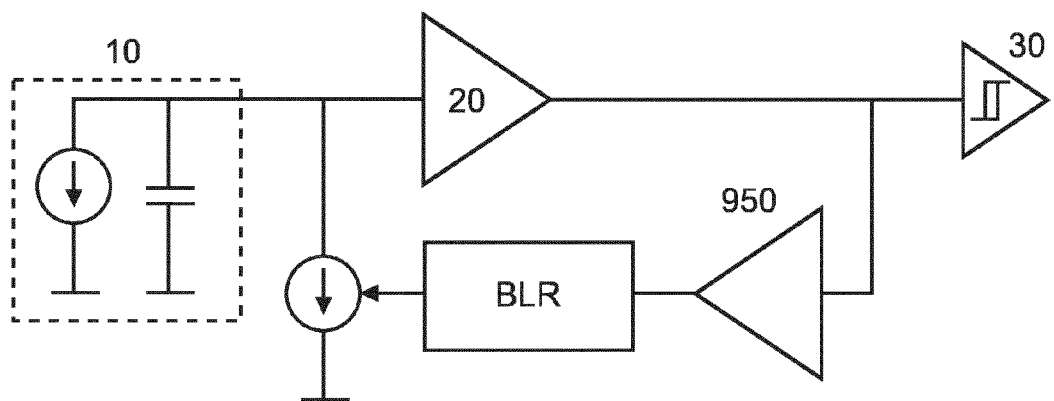
FIG. 9 shows schematically and exemplarily an embodiment of a front-end channel having a baseline restorer circuit and a voltage limiter to ignore positive excursions of the shaper signal.

FIG. 9 shows a block diagram of an embodiment of adding a voltage limiter 950 to the input of baseline restorer circuit BLR to ignore positive excursions of the shaper signal. The purpose of limiter 950 is to clip any excursion of the signal of shaping element 20 above the baseline BL, i.e. the maximum signal that the peak detector can ever sense is the baseline level BL itself. A variety of options exist to implement limiter 950, including amplifier limiter stages or force clipping at the output stage of a unity gain buffer, or a rectifier for the difference signal of baseline and shaper output, which suppresses positive half-waves.

The embodiment described with reference to FIG. 9 is not limited to the polarities mentioned throughout the description and can be adapted to other front-end topologies (including hole-collection, single stage front-end, etc.).

Figure 10:
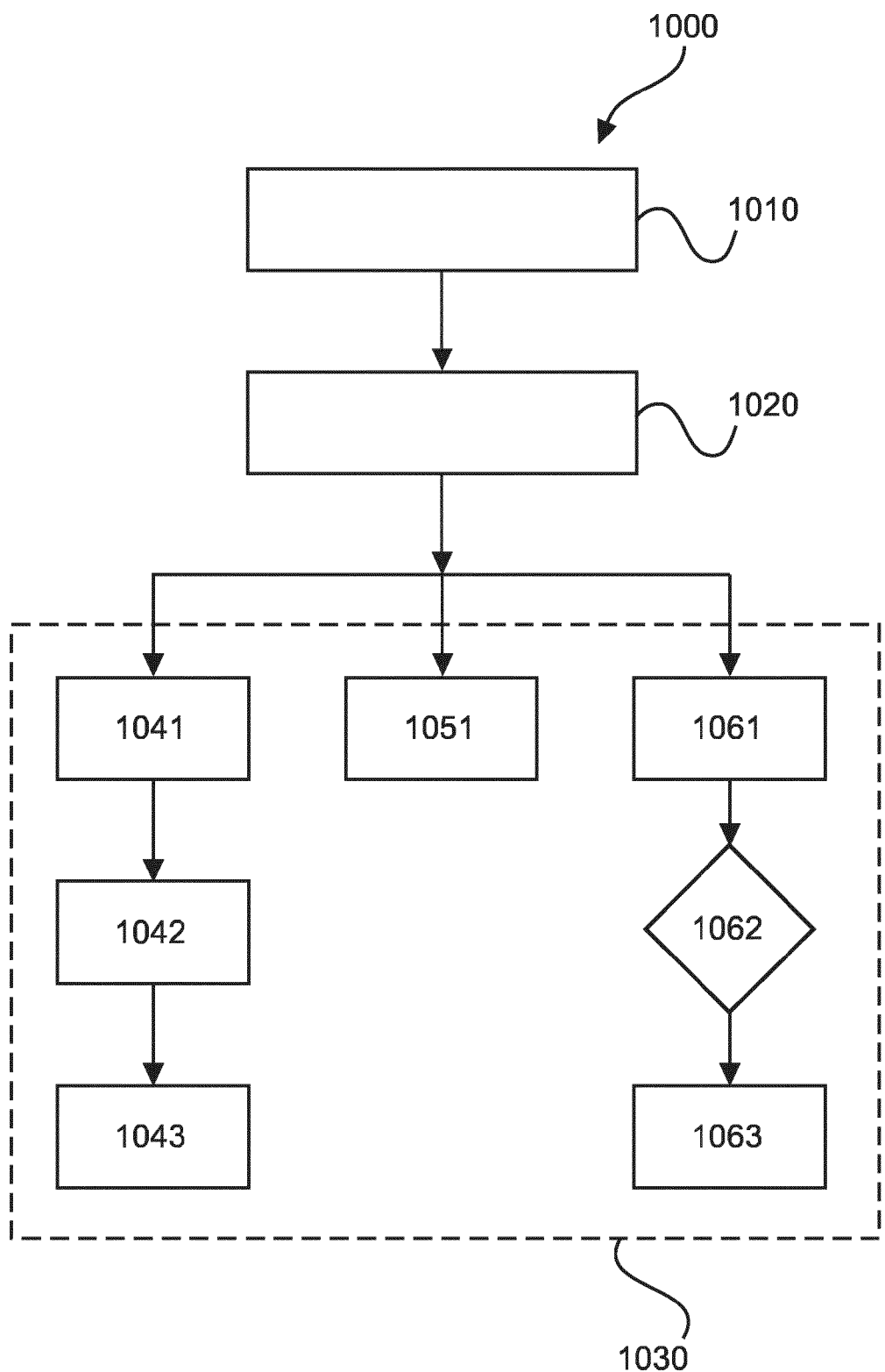
FIG. 10 shows schematically and exemplarily an embodiment of a detection method according to the present invention.

FIG. 10 shows schematically and exemplarily an embodiment of a detection method 1000 for detecting photons emitted by a radiation source 2 by a detection device 6. Detection method 1000 comprises the following steps 1010, 1020, and 1030:

providing (step 1010) a sensor 10 comprising an anode, a cathode and an intermediate direct conversion material for converting photons into electrons and holes, converting (step 1020) a charge pulse generated by a photon into an electrical pulse, and providing (step 1030) a compensation signal based on the electrical pulse.

As can be further seen from FIG. 10, providing (1030) a compensation signal may comprise measuring (step 1041) a total sensor current of the sensor 10, measuring (step 1042) a photo-conductive gain, and determining (step 1043) a compensation current from the measured total sensor current and the photo-conductive gain.

As can be further seen from FIG. 10, providing (1030) a compensation signal may alternatively and/or additionally comprise determining (step 1051) a degree of polarization within the sensor 10 from a baseline restorer current $I_{BLR}$.

As can be further seen from FIG. 10, providing (1030) a compensation signal may alternatively and/or additionally comprise providing (step 1061) the electrical pulse to a limiter circuit 950, assessing (step 1062) whether or not the electrical pulse is below a predefined threshold, and providing (step 1063) the electrical pulse to a baseline restorer circuit BLR if the limiter circuit 950 determines that the electrical pulse is below a predefined threshold.

An example application of the invention is spectral computed tomography applications but is applicable to circuits of similar functionality in other applications. A further example application is photon counting detectors for spectral computed tomography and spectral mammography. A further example application relates to all kinds of photon counting radiation detectors based on direct conversion detectors, for example in medical imaging systems, instruments for scientific purposes, or homeland security.

Although, cathode contacts are relevant for CZT, for different types of direct conversion material, the anode contacts may be relevant. Further, note that any direct converting material with different transit times for holes and electrons will be polarized at a certain flux, as charge with the longer transit time will be accumulated in the material and cause polarization. Therefore, the invention is also applicable to, e.g., GaAs.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Determinations like measuring a total sensor current of the sensor, measuring a photo-conductive gain, determining a compensation current from the measured total sensor current and the photo-conductive gain, determining a degree of polarization within the sensor from a baseline restorer current, et cetera performed by one or several units or devices can be performed by any other number of units or devices. For example, the determination of a compensation current from the measured total sensor current and the photo-conductive gain can be performed by a single unit of by any other number of different units. The determinations and/or the control of the detection device in accordance with the above described detection method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The present invention relates to a detection device for detecting photons emitted by a radiation source. The detection device is configured to detect the photons during a first time period. The detection device comprises a sensor having an intermediate direct conversion material for converting photons into electrons and holes, a shaping element, and a compensation unit. The compensation unit is adapted to provide a compensation signal based on the electrical pulse and on a photoconductive gain of said sensor. The core of the invention is to provide circuits to reduce artifacts due to inherent errors with direct conversion detectors in spectral computed tomography by determining a compensation current, by detecting or monitoring a baseline restorer feedback signal, or by ignoring signals above the baseline level.

The invention claimed is:

1. A detection device for detecting photons emitted by a radiation source, wherein the detection device is configured to detect the photons during a first time period, the detection device comprising:
   a sensor comprising an anode, a cathode and an intermediate direct conversion material for converting photons into electrons and holes,
   a shaping element adapted to convert a charge pulse generated by a photon into an electrical pulse, and
   a compensation unit coupled between an output of the shaping element and an input of the shaping element,
   wherein the compensation unit comprises a photoconductive gain providing circuitry, wherein said photoconductive gain providing circuitry is configured to provide a photoconductive gain for said sensor,
   wherein the compensation unit further comprises a second-time-period current providing unit, wherein said second-time-period current providing unit is configured to provide a current from said sensor during at least a second time period, wherein said second time period is shorter than said first time period,
   wherein the compensation unit is adapted to provide a compensation signal to said shaping element,
   wherein said compensation signal is based on the current from said sensor and on the photoconductive gain for said sensor.

2. The detection device according to claim 1, wherein the compensation unit comprises a first, second, and third current source, and a first and a second transistor; and wherein a source of the first transistor and a source of the second transistor are coupled to the first current source.

3. The detection device according to claim 2, wherein a drain of the first transistor is coupled to the second current source; wherein a drain of the second transistor is coupled to the third current source; wherein the electrical pulse is provided to a gate of the first transistor; wherein a reference voltage is provided to a gate of the second transistor; and wherein the drain of the second transistor is coupled to the input of the shaping element.

4. The detection device according to claim 2, wherein the detection device further comprises:
   a baseline restorer circuit;
   a switching network comprises first, second, third, and fourth switches wherein the baseline restorer circuit is coupled between the first and second switches; and
   a current mirror;
   wherein the detection device is operable in a first and a second mode; wherein, in the first mode, the first and second switches are closed so that the baseline restorer circuit is operable, the third switch couples a drain of the second transistor to the current mirror, and the fourth switch couples a drain of the first transistor to ground; and wherein, in the second mode, the first and second switches are open, so that the baseline restorer circuit is disconnected and the third switch couples the drain of the second transistor to the drain of the first transistor.

5. The detection device according to claim 2, wherein the detection device further comprises a fourth current source, wherein the fourth current source is coupled between a drain of the second transistor and a drain of the first transistor.

6. The detection device according to claim 5, wherein the detection device further comprises a digital-to-analog converter and an integrating channel, wherein the digital-to-analog converter s coupled between an output of the integrating channel and a control input of the fourth current source.

7. The detection device according to claim 1, wherein the compensation unit further comprises a baseline restorer circuit.

8. The detection device according to claim 1, wherein the compensation unit comprises a baseline restorer circuit, and a polarization determination unit, wherein the polarization determination unit is adapted to determine a degree of polarization within the sensor from a baseline restorer current from the baseline restorer circuit.

9. The detection device according to claim 8, wherein the polarization determination unit further comprises an integrator circuit, wherein the integrator circuit is adapted to integrate a baseline restorer current from the baseline restorer circuit and to provide the baseline restorer current to the input of the shaping element.

10. The detection device according to claim 1, wherein the compensation unit comprises a baseline restorer circuit and a limiter circuit, wherein the limiter circuit is coupled between the output of the shaping element and the input of the baseline restorer circuit.

11. The detection device according to claim 10, wherein the limiter circuit is adapted to block provision of the electrical pulse to the baseline restorer circuit, if the electrical pulse is above a predetermined threshold.

12. The detection device according to claim 1, wherein the second time period is within the first time period; wherein the second-time-period current providing unit is configured to measure a pixel current from said sensor during the second time period; and wherein the current from said sensor provided by the second-time-period current providing unit corresponds to said pixel current.

13. A detection method for detecting photons emitted by a radiation source by a detection device during a first time period, the detection method comprising:
   providing a sensor comprising an anode, a cathode and an intermediate direct conversion material for converting photons into electrons and holes, providing a photoconductive gain for said sensor, converting, with a shaping element, a charge pulse generated by a photon into an electrical pulse, providing a current from said sensor during at least a second time period, wherein said second time period is shorter than said first time period, providing a compensation signal to the shaping element, wherein the compensation signal is based on the current from said sensor and on the photoconductive gain for said sensor, and processing the electrical pulses to form an image.

14. The detection method according to claim 13, wherein providing a compensation signal comprises determining a degree of polarization within the sensor from a baseline restorer current.

15. The detection method according to claim 13, wherein providing a compensation signal comprises:

providing the electrical pulse to a limiter circuit and providing the electrical pulse to a baseline restorer circuit if the limiter circuit determines that the electrical pulse is below a predefined threshold.

\* \* \* \* \*